United States Patent Office 3,126,254
Patented Mar. 24, 1964

3,126,254
PROCESS FOR PREPARING METAL AMMONIUM PHOSPHATES
Murrell L. Salutsky, Silver Spring, Frederick S. Lee, Owings Mills, and Grover L. Bridger, Baltimore, Md., assignors to W. R. Grace & Co., New York, N.Y., a corporation of Connecticut
No Drawing. Filed Aug. 24, 1960, Ser. No. 51,541
1 Claim. (Cl. 23—105)

This invention relates to metal ammonium phosphates and in a particular aspect it relates to a process for preparing such compounds wherein the metal is in the bivalent state.

Metal ammonium phosphates are versatile compounds responding to many uses. Several have been suggested as fire retardants in paints and plastics. See Japanese Patent No. 173,488 (1946); Dutch Patent No. 74,804 (1954), and the article by Vol'fkovich et al., "Ammonium Phosphates of Magnesium, Zinc and Iron," Issledovaniya po Priklad. Khim., Akad. Nauk S.S.S.R., Otdel Khim. Nauk 1955, 149; C.A. 50, 6243 g. U.S. Patent No. 2,419,017 (1947) describes use of ferrous ammonium phosphate as a rust inhibiting pigment. Magnesium ammonium phosphate is disclosed in U.S. Patent No. 2,690,100 (1954) as useful in fire resistant insulation. Zinc ammonium phosphate is described in U.S. Patent No. 2,555,224 (1951) as useful in preparing artificial pearl essences for ornamental plastics, and U.S. Patent No. 2,514,941 (1950) discloses its use to increase the corrosion resistance of metals. Many of the metal ammonium phosphates are possessed of beautiful pastel shades and have found utility as pigments in ceramic glazes. Among these are magnesium, manganese, zinc-cobalt, cobalt, copper, nickel, ferrous and zinc ammonium phosphate. Such uses are described in U.S. patent application, Serial No. 53,923, filed September 6, 1960.

Because of their low solubility and non-toxicity, we have discovered that metal ammonuim phosphates are excellent sources of slowly available nitrogen, phosphorous and metallic plant nutrients which makes them particularly suitable as fertilizers.

With but few exceptions, the nutrient content of commerical fertilizers are highly soluble. Supplementary trace elements and even some of the primary elements, such as nitrogen and potassium, are generally added to soils as water-soluble compounds. There are many applications for which fertilizer materials of low water solubility are preferred wherein the nutrients are gradually available to plants over an entire growing season. For example, in agricultural areas in which the soil is sandy and rainfall plentiful much of the plant nutrient content of ordinary fertilizers is leached from the soil before becoming available to the plants. To compensate for this loss, it is necessary to add the fertilizer several times during a growing season or to substantially increase the initial application. The first-alternative requires additional expenditures of labor and the latter may result in over-fertilization or "burning" of the crop.

Non-burning ingredients are also highly desirable as lawn fertilizers. Most of the lawn fertilizers currently marketed depend on the fertilizer being applied in a prescribed manner to prevent burning rather than on the inherent non-burning properties of the respective ingredients. The phosphorus and the trace elements which are derived from water-soluble sources generally become fixed by the soil or leach out and, hence, are unavailable for plant growth.

It is, therefore, an object of this invention to provide a process for preparing metal ammonium phosphates which are suitable compounds for the aforementioned applications and in particular for fertilizers wherein the various plant nutrients are slowly available over a prolonged period of use. This objective is accomplished by reacting in an aqueous medium phosphoric acid and a phosphoric acid-soluble metallic compound in which the metallic component is in the bivalent state, and thereafter treating the resulting reaction mixture with ammonia. The metal ammonium phosphates prepared according to this process include magnesium, ferrous, manganese, cupric, zinc, cobalt and nickel ammonium phosphate. Starting materials suitable for carrying out this invention include the oxides, carbonates, hydroxides, chlorides, sulfates, nitrates and naturally-occurring silicates of the aforenamed metals.

In describing the invention, particular reference is made to the preparation of magnesium ammmonium phosphate, but it is to be understood that the general steps of the process are followed in preparing other metal ammonium phosphates. Suitable sources of magnesium are magnesite; sea water magnesia; magnesium silicates, such as olivine and serpentine; magnesium sulfates, such as Epsom salts, or langbeinite; magnesium chlorides, including natural brines and sea water; or a mixture of these compounds. Suitable sources of phosphoric acid are either furnace or wet process grades.

The process is carried out by first reacting one mole of a suitable metal compound and one mole of phosphoric acid in the presence of at least two moles and preferably an excess of free water. The reaction may be postulated as follows in which magnesia is employed as a typical starting material:

$$MgO + H_3PO_4 + 2H_2O \rightarrow MgHPO_4 \cdot 3H_2O$$

A preferred embodiment is to first grind the magnesium compound to a finely divided state, add water to the fine particles to form a slurry and then contact the slurry with phosphoric acid solution. The resulting mixture is thoroughly agitated during formation of the dimagnesium phosphate and, if desired, the acid may be preheated to accelerate the reaction. A slight excess (about 2%) of the magnesium compound over the stoichiometric quantity of phosphoric acid is preferred to assure substantially complete recovery of the $P_2O_5$ values. Magnesium compounds particularly suitable for forming dimagnesium phosphate are magnesia, magnesium silicate, magnesium carbonate and magnesium hydroxide.

The presence of water in the system is necessary to form the intermediate dimagnesium phosphate trihydrate, which formation, in turn, is essential to produce the ultimate magnesium ammonium phosphate by direct ammoniation of the trihydrate. In this invention, sufficient water is provided by introducing the metal compound in aqueous slurry, using diluted solutions of phosphoric acid, or both.

After the requisite amounts of the reactants have been contacted, the mixture is digested by heating at a temperature of about 175° F. to about 225° F. for about 10 minutes to four hours. This may be feasibly carried out by using a jacketed tank and passing steam into the jacket. During such heating, the mixture is vigorously agitated to assure complete reaction of the components. Upon termination of the digestion period, the slurry exhibits a pH of from about 2.0 to the neutral point depending on the concentration of the acid and magnesia. The practical Ph range is about 4.0 to 6.0.

Following the digestion period, the dimagnesium phosphate slurry is neutralized by gradually adding ammonia and thereby effecting formation of magnesium ammonium phosphate. Ammonia may be employed in anhydrous form or as an aqueous solution. When anhydrous ammonia is used, it is necessary to resort to external addition of water, at least one mole per mole of dry $MgHPO_4 \cdot 3H_2O$ and preferably an excess, to insure formation of the magnesium ammonium phosphate. As will be shown hereinafter, the reaction of dry $MgHPO_4.3H_2O$ with liquid anhydrous ammonia failed to yield the expected product. Other possible sources of ammonia suitable for use in this invention are ammonium salts or compounds which undergo hydrolysis or other degradative action to form ammonia or ammonium salts, such as urea.

The ammonia is added in amount sufficient to reach the neutral point and preferably until a pH of about 7 to 9 is reached. After the requisite amount has been added, the ammoniated mixture is digested by heating for about one hour to several days and at a temperature of between about 75° F. to about 225° F. The product is then filtered, washed with water, and dried to constant weight at a temperature ranging from about 150° F. to about 225° F.

Magnesium ammonium phosphate as thus prepared is slowly soluble and may be applied as such to growing plants without fear of any consequent injury. To form a complete fertilizer, it may be admixed with a suitable potassium compound. In addition, the other metal ammonium phosphates may be added to it or to a separate fertilizer mixture provide the desired secondary and trace elements.

Magnesium ammonium phosphate forms two stable hydrates:

(1) $MgNH_4PO_4.6H_2O$ (N, 5.7%; $P_2O_5$, 28.9%; $K_2O$, 0%; MgO, 16.4%) and
(2) $MgNH_4PO_4.H_2O$ (N, 9.0%; $P_2O_5$, 45.7%; $K_2O$, 0%; MgO, 25.9%)

Both hydrates may be prepared from aqueous solutions according to the process of this invention. The transition temperature of the monohydrate to the hexahydrate being a minimum of about 56° C. where reagent grade reactants are used and somewhat higher when reactants containing impurities are used. Preparation at room temperature results in formation of the hexahydrate. To obtain the monohydrate without loss of nitrogen, the reaction must be carried out in hot solutions.

The monohydrate is the more desirable fertilizer product because the nitrogen and $P_2O_5$ content is increased on a weight percentage basis due to the decrease in molecular weight which is brought about by dehydrating the hexahydrate. The monohydrate is also much more stable than the hexahydrate. Losses of ammonia from the monohydrate on standing are insignificant whereas the hexahydrate will gradually lose ammonia at temperatures as low as 35° C.

Magnesium ammonium phosphate may be prepared according to the process of this invention with or without the production of a by-product. The use of the sulfates, Epsom salts and langbeinite, as sources of magnesium, yield ammonium sulfate as a by-product as indicated by the following equations:

$MgSO_4.7H_2O + H_3PO_4 + 3NH_4OH \rightarrow$
$MgNH_4PO_4.H_2O + (NH_4)_2SO_4 + 9H_2O$

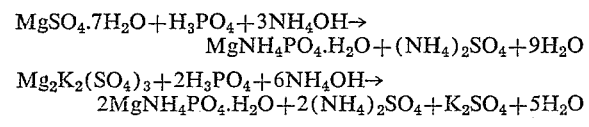

The langbeinite would, in addition, yield potassium sulfate as a by-product. When the preparation is carried out from moderately dilute solutions (i.e., approximately one pound of product per gallon of solution), followed by filtration, a relatively pure magnesium ammonium phosphate is produced. The ammonium sulfate and potassium sulfate remaining in the filtrate may be recovered by suitable means.

If formation of by-products is not desired, the magnesium ammonium phosphate may be prepared as a thick slurry by limiting the water content to only that amount added to the reagents. Under these conditions, the heat of neutralization is sufficient to produce the monohydrate. By evaporating the entire mass, a fertilizer containing a mixture of magnesium ammonium phosphate monohydrate and ammonium sulfate (and potassium sulfate) is obtained. The use of Epsom salts yields a fertilizer having an $N—P_2O_5—K_2O—MgO$ analysis of 14–24–0–14 and langbeinite yields one having 11–19–12–11.

When magnesia and alivine are used as sources of magnesium, no by-product is produced as illustrated by the following equations:

$MgO + H_3PO_4 + NH_4OH \rightarrow MgNH_4PO_4.H_2O + H_2O$

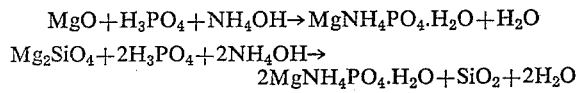

In using alivine, the product is diluted with silica, yielding a fertilizer of the approximate composition 7.5–38–0–20, whereas with magnesia the composition is 9–45–0–26 using reagent grade chemicals. The use of industrial grade chemicals results in a composition of about 8–40–0–25. The silica need not be separated but may be carried along as a filler in the ultimate fertilizer mix. In both cases, essentially all the nitrogen is water-insoluble. The water used in these reactions could be recycled because it is virtually free of dissolved salts as the equations indicate.

The invention is further illustrated by the following examples. Examples I(a) to I(j) relate to a series covering preparation of magnesium ammonium phosphate. Examples II to VII describe various preparations of ferrous, manganese, zinc, copper, cobalt and nickel ammonium phosphates.

EXAMPLE I(a)

72.4 g. of 75% phosphoric acid were diluted with 800 ml. of water. To this solution there were then rapidly added with stirring an aqueous slurry consisting of 27 g. magnesia and 90 ml. of water. The mixture was heated for 1 hour at 100° C. after which time no phosphate could be detected in the liquid phase. To the resulting hot aqueous slurry of $MgHPO_4.3H_2O$ there were added 78 ml. of 28% aqua ammonia over a period of 15 to 20 minutes. The temperature of the slurry was maintained at 100° C. for 1 hour following which no phosphate could again be detected in the liquid phase. The product was then filtered and dried at 70° C. The yield was 101 g. of $MgNH_4PO_4.H_2O$.

EXAMPLE I(b)

25.95 pounds of magnesia were diluted with 75 gallons of demineralized water accompanied with agitation. Thereafter, 88.32 pounds of 75% furnace grade phosphoric acid were added over a period of about 15 minutes. The temperature of the slurry was 120° F. and the volume was made up to approximately 90 gallons by the addition of water. The slurry was then heated to 190–195° F., held at this temperature for 1½ hours, and then allowed to stand unheated overnight. The next morning, the slurry was reheated to 190° F. and upon reaching this temperature sufficient anhydrous ammonia was bubbled into the slurry until a pH of 8.8 was reached. After a 20-minute digestion period, the product was allowed to settle, then filtered, and the filter cake was washed with 20 gallons of water, and finally dried at 140° F. for 136 hours. The yield was 94.5 pounds of $MgNH_4PO_4.H_2O$.

EXAMPLE I(c)

27 pounds of magnesia were slurried with 81 pounds of water. To this slurry there were then added 84.1 pounds of 75% furnace grade phosphoric acid diluted with 130.2 pounds of water. The mixture was stirred and digested at 195° F. for 1 hour after which time 11 pounds of anhydrous ammonia were bubbled in while maintaining a temperature of 195° F. The final pH ranged between about 7 and 8. This mixture was then thoroughly stirred and digested at 195° F. for one hour, filtered, and the resulting $MgNH_4PO_4.H_2O$ was dried at 160–212° F.

EXAMPLE I(d)

27 pounds of magnesia were slurried with 81 pounds of water and then added to 114.2 pounds of wet process $H_3PO_4$ (40% $P_2O_5$) diluted with 766.8 pounds of water. The resulting mixture was stirred and digested at 195° F. for 1 hour and then 11 pounds of anhydrous ammonia were bubbled in while maintaining the temperature at 195° F. The final pH ranged between about 7 and 8. After all of the ammonia was added the resulting mixture was stirred and digested at 195° F. for 1 hour and then filtered. The recovered $MgNH_4PO_4 \cdot H_2O$ was finally dried at 160–212° F.

EXAMPLE I(e)

200 g. of micropulverized serpentine were slurried with 200 ml. of water and then added to 377 g. hot wet process phosphoric acid (39.80% $P_2O_5$) at such rate that all of the serpentine was present in the reaction zone within 15 minutes. It was digested with the acid for 4 hours at 100° C. After the digestion period was completed, 400 ml. of water at 100° C. were placed into the zone to prevent "setting up" in the following step of the preparation. Thereafter, sufficient 28% ammonium hydroxide solution was added over a 15-minute period to bring the pH of the slurry to a value between 7 and 8 while maintaining the temperature at 100° C. The digestion was continued at 100° C. for 1 hour, and the slurry was then filtered. The $MgNH_4PO_4 \cdot H_2O$ filter cake was dried to constant weight at 70° C., resulting in a yield of 416.2 g. of product.

EXAMPLE I(f)

160 pounds of serpentine (48.5% MgO) were slurried with approximately 220 pounds of water in a mixing tank. 307 pounds of wet process phosphoric acid (53.10% $P_2O_5$) were diluted with approximately 200 pounds of water and then added with agitation to the serpentine slurry. The slurry was brought up to 212° F. and the mixture was digested for 3 hours at that temperature. Thereafter, 23 pounds of MgO (96% pure) were slurried in approximately 50 pounds of water and then added to the reaction mixture. Digestion was continued at 212° F. for an additional hour and the slurry was then pumped to another tank and diluted with water to 480 gallons. Sufficient anhydrous ammonia was then introduced into the slurry, which was maintained at 212° F., until the pH reached a value of between about 8 and 9. The ammoniated slurry was digested at 212° F. for 1 hour, then filtered and finally dried at 190–205° F. This procedure yielded 390 pounds of product consisting essentially of $MgNH_4PO_4 \cdot H_2O$ diluted with impurities derived from the reactants.

EXAMPLE I(g)

282.5 g. of wet process phosphoric acid (53.10% $P_2O_5$) were diluted with 350 ml. of water and placed in a 2-liter beaker and the solution was heated to a temperature of 80° C. 150 g. of micropulverized serpentine (48.45% MgO) were slurried with 230 ml. of water and added to the beaker. The temperature was raised to 100° C. and stirred at 95–100° C. for 3 hours. 21.74 g. of MgO (96% purity) were slurried in 20 ml. of water and added to the beaker. The resulting mixture was digested at 95–100° C. for 1 hour and then concentrated ammonium hydroxide solution was added in amount sufficient to raise the pH of the mixture to between about 7 and 8. After continuing the digestion period for another hour and at 95° C., the slurry was filtered and the wet cake was dried to constant weight at 70° C. This yielded 382.9 g. of $MgNH_4PO_4 \cdot H_2O$.

EXAMPLE I(h)

Three liters of raw sea water, obtained from the coastal region at Ocean City, Maryland, were acidified with the stoichiometric amount of phosphoric acid to react with the bivalent ions in the sea water. The mixture was then neutralized with ammonia to precipitate a mixture of about 88% magnesium ammonium phosphate hexahydrate and 12% dicalcium phosphate. The yield of hexahydrate was 36 grams and analyzed 4.88% N, 30.45% $P_2O_5$ and 15.98% MgO. In addition, it contained many of the trace elements normally found in sea water.

EXAMPLE I(i)

100 g. of ground olivine were mixed with 165 g. of 85% $H_3PO_4$ (5% excess over the theoretical amount). The mixture was diluted with an equal volume of water resulting in an acid concentration of 40%. It was digested for 8 hours on a hot plate and then diluted with water to 3 liters. 25 ml. of 6% $H_2SO_3$ were added to insure iron reduction. The mixture was heated to 80° C., neutralized by slowly adding ammonium hydroxide, and digested for about 2 hours at 80° C. The resulting precipitate was composed of two solids: (1) a dense solid which was obviously residual unreacted olivine; and (2) $MgNH_4PO_4$ which was a plate-like solid of low density. The fractions were separated by flotation, filtered and dried.

EXAMPLE I(j)

This example illustrates an embodiment of the invention for producing $MgNH_4PO_4 \cdot H_2O$ on a continuous basis while eliminating the filtration step. Briefly, it consists in gradually feeding an aqueous slurry of $MgHPO_4 \cdot 3H_2O$ and sufficient liquid anhydrous ammonia to maintain a pH of 8 to 9 to a heel of $MgNH_4PO_4 \cdot H_2O$ slurry. The specific details of the process are described as follows:

10.75 pounds of MgO were slurried in 1.5 gallons of water. The aqueous slurry was gradually added with stirring to a mixture consisting of 40 pounds of wet process $H_3PO_4$ (52.3% $P_2O_5$, 3.05% $Al_2O_3$ and 3.34% $Fe_2O_3$) and 10 gallons of water. The resulting $$MgPHO_4 \cdot 3H_2O$$

slurry was heated to 90° C. and maintained at this temperature with vigorous agitation for one hour to insure complete reaction.

A heel of $MgNH_4PO_4 \cdot H_2O$ was prepared by stirring and gradually adding 40 pounds of dry $MgNH_4PO_4 \cdot H_2O$ to 7.5 gallons of water which was previously adjusted to a pH of 9 with ammonia. The mixture was heated to 90° C. The $MgHPO_4 \cdot 3H_2O$ slurry and liquid anhydrous ammonia were then gradually added to the heel accompanied with vigorous agitation and while maintaining a temperature of 90° C. and a pH of 8 to 9. The rate of addition of $MgHPO_4 \cdot 3H_2O$ and $NH_3$ were so adjusted so that the product slurry of $MgNH_4PO_4 \cdot H_2O$ was continuously removed after an average digestion period of one hour was realized. The resulting hot 40%

$$MgNH_4PO_4 \cdot H_2O$$

slurry was granulated and then dried at 110° C.

The $MgNH_4PO_4 \cdot H_2O$ product analyzed as follows:

| | Percent |
|---|---|
| Moisture @ 100° C. | 3.96 |
| N | 7.96 |
| Total $P_2O_5$ | 41.70 |
| Insoluble $P_2O_5$ | 0.24 |
| Available $P_2O_5$ | 41.36 |
| MgO | 23.79 |
| Water soluble N | 1.16 |

EXAMPLE II

*(Ferrous Ammonium Phosphate Monohydrate)*

A solution was prepared by dissolving 213 g. of $FeCl_2 \cdot 4H_2O$ in a liter of water. To this solution there were added 75 ml. of 6% sulfurous acid (containing sufficient $SO_2$ to reduce 10% of the iron) followed by the addition of 150 g. of 85% phosphoric acid. The solution was prepared at room temperature. It was diluted to 3 liters by the addition of water, and concentrated ammonium hydroxide solution was then added slowly with stirring until a pH of 7.5 was reached (calculated volume of $NH_4OH$ was 250 ml.). The mixture was heated to 70–80° C. and digested at this temperature with stirring for 6 hours. During this period the pH was maintained at 7. The mixture was cooled, filtered, and the recovered ferrous ammonium phosphate monohydrate was washed 3 times with 1-liter quantities of distilled water. After the final wash, it was dried as much as possible on a Buchner funnel and finally dried to constant weight at room temperature. The dried sample weighed 202 g.

EXAMPLE III (*Manganese Ammonium Phosphate Monohydrate*)

1 pound of $MnCl_2.4H_2O$ was dissolved in 2 liters of water and the solution was acidified with 278 g. of phosphoric acid. Concentrated ammonium hydroxide was slowly added to the reaction mixture with stirring until a pH of 7 was reached (about 500 ml. were required). The ammoniated mixture was stirred and digested for one hour at room temperature while maintaining the pH at 7 throughout the digestion period. The mixture was filtered and the recovered manganese ammonium phosphate monohydrate was washed 3 times with 2 liters of water. In each washing step the precipitate was transferred to the wash solution, stirred for 1 hour, and filtered. The washed precipitate was dried overnight at 85° C. and finally at 105° C. The dried sample weighed 424 g.

EXAMPLE IV (*Zinc Ammonium Phosphate*)

1 pound of $ZnCl_2$, dissolved in 2 liters of water, was acidified with 403 g. of 85% phosphoric acid and the resulting solution was heated for a time sufficient to reach 80° C. Concentrated ammonium hydroxide solution was slowly added with stirring until a pH of 7 was reached (about 690 ml. were required) and the ammoniated mixture was digested at 80° C. with stirring for about 2 hours. The mixture was filtered and the recovered zinc ammonium phosphate was washed 3 times with 2 liters of water. In each washing step, the precipitate was transferred to the wash solution, stirred for 30 minutes and then filtered. The washed precipitate was finally dried overnight at 100° C. The dried sample weighed 579 g.

EXAMPLE V (*Cupric Ammonium Phosphate Monohydrate*)

199 g. of $CuCl_2.2H_2O$ were dissolved in 1 liter of water. To this solution there were then added 140 g. of 85% phosphoric acid at room temperature and the resulting solution was diluted with water to 3 liters. Concentrated ammonium hydroxide solution was then slowly added with stirring until a pH of 7 was reached. (The calculated volume was 236 ml.). The precipitate was digested at room temperature for 6 days with stirring of the solution being effected during the daytime periods. Periodically, the pH was adjusted to 7 with small additions of ammonium hydroxide. After a few days, two solid phases developed: one dark blue and very dense; the other being lighter blue and less dense. Chemical and X-ray analyses of the two solid phases proved that they had identical composition, i.e., $CuNH_4PO_4.H_2O$. The copper ammonium phosphate monohydrate was filtered, washed thoroughly with water and dried at room temperature. The dried sample weighed 223 g.

EXAMPLE VI (*Cobalt Ammonium Phosphate Monohydrate*)

195 g. of $Co(NO_3)_2.6H_2O$ were dissolved in 1 liter of water to which was added 80 g. of 85% phosphoric acid and at room temperature. The resulting solution was diluted with water to 3 liters. Concentrated ammonium hydroxide solution was thereafter slowly added with stirring until a pH of 7 was reached. The mixture was digested with continuous stirring at room temperature for 3 days after which the resulting cobalt ammonium phosphate monohydrate was filtered, washed 3 times with water, and dried at room temperature. The dried sample weighed 123 g.

EXAMPLE VII (*Nickel Ammonium Phosphate Hexahydrate*)

173 g. of $NiCl_2.6H_2O$ were dissolved in a liter of water. 94 g. of 85% phosphoric acid were then added at room temperature and the resulting solution was diluted with water to 3 liters. Concentrated ammonium hydroxide solution was thereafter slowly added with stirring until a pH of 7.5 was reached (the calculated volume of $NH_4OH$ was 164 ml.). The mixture was then stirred for 2 hours at room temperature, allowed to stand overnight, and then filtered. The recovered nickel ammonium phosphate hexahydrate was washed with water and dried at room temperature. The dried sample weighed 216 g.

The following example illustrates preparation of a number of metal ammonium phosphates using various metal compounds as starting materials. In general, each preparation consisted of diluting a mixture of acid and metal compound with water, heating the diluted mixture at about 75° F. to about 225° F., ammoniating, digesting the ammoniated mixture at about 75° F. to about 225° F., washing and drying the final product.

EXAMPLE VIII

| Starting Metal Compound | | 85% $H_3PO_4$ (grams) | Total Dilution Metal Compound Acid and Water (liters) | pH of Ammoniated Mixture | Digestion of Ammoniated Mixture | | Product | |
|---|---|---|---|---|---|---|---|---|
| Compound | Weight (grams) | | | | Time | Temp., °C. | Metal Ammonium Phosphate | Weight (grams) |
| $MgCl_2.6H_2O$ | 380 | 216 | 3 | 8.0 | 2 hrs. | 80 | $MgNH_4PO_4.H_2O$ | 279 |
| $MgSO_4.7H_2O$ | 454 | 213 | 2.5 | 7.5 | 2 hrs. | 80 | $MgNH_4PO_4.H_2O$ | 260 |
| $MgSO_4.7H_2O$ | 227 | 106 | 2.5 | 7.5 | 2 hrs. | 25 | $MgNH_4PO_4.6H_2O$ | 225 |
| Olivine [a] | 100 | 165 | 3 | 7.5 | 2 hrs. | 80 | $MgNH_4PO_4.H_2O$ | 196 |
| $FeSO_4.7H_2O$ | 298 | 150 | 3 | 7.5 | 6 hrs. | 80 | $FeNH_4PO_4.H_2O$ | 194 |
| $MnSO_4$ [b] | 492 | 300 | 2 | 7.0 | 1 hr. | 25 | $MnNH_4PO_4.H_2O$ | 482 |
| $NiCl_2.6H_2O$ | 193 | 94 | 3 | 7.5 | 2 hrs. | 90 | $NiNH_4PO_4.H_2O$ | 157 |
| Copperas [c] | 298 | 150 | 2 | 7.5 | 2 hrs. | 95 | $FeNH_4PO_4.H_2O$ | 212 |
| $CuSO_4.5H_2O$ | 2,915 | 1,400 | 16 | 7.0 | 10 days | 25 | $CuNH_4PO_4.H_2O$ | |

[a] Olivine is a natural magnesium silicate containing iron. It was mixed with acid and an equal volume of water, digested at boiling temperature for 8 hours and then diluted to 3 liters.
[b] Agricultural grade containing 75% $MnSO_4$.
[c] Waste $FeSO_4.7H_2O$ obtained from the $TiO_2$ pigment industry. Contains approximately 95% $FeSO_4.7H_2O$.

The following example shows the need for free water in order to effect formation of the metal ammonium phosphate notwithstanding the fact that one reagent contained chemically-bound water.

EXAMPLE IX 12.60 grams of reagent grade dry $MgHPO_4 \cdot 3H_2O$ were slowly added to liquid anhydrous ammonia condensed in an 8-inch flexible tube (a half-filled tube indicates presence of an excess of ammonia). The reactants were in contact with each other for approximately one-half hour after which time the ammonia was evaporated off. The residue was recovered and analyzed 12.25 grams of $MgHPO_4 \cdot 3H_2O$, which indicates little or no formation of the expected magnesium ammonium phosphate.

We claim:

Process for preparing metal ammonium phosphates which comprises digesting phosphoric acid and a substantially stoichiometric quantity of a phosphoric acid-soluble metallic compound selected from the group consisting of oxides, carbonates, hydroxides, chlorides, sulfates, nitrates, and naturally-occurring silicates of a bivalent metal selected from the group consisting of iron, manganese, copper, zinc, cobalt, and nickel in an aqueous medium containing sufficient water to form an intermediate trihydrate of the resulting dimetal properties, at about 175–220° F. for about 10 minutes to about 4 hours, thereby bringing the pH of the reaction mixture to about 4.0–6.0, and subsequently adding ammonia to said mixture to raise the pH of said mixture to about 7–9, digesting the thus treated mixture at about 75–225° F. for about one hour to several days, recovering the resulting metal ammonium phosphate, washing said phosphate with water, and drying said washed phosphate at about 150–225° F.

References Cited in the file of this patent

UNITED STATES PATENTS

| | | |
|---|---|---|
| 1,881,195 | Kaselitz | Oct. 4, 1932 |
| 1,913,539 | Friedrich | June 13, 1933 |
| 2,093,461 | MacIntire | Sept. 21, 1937 |
| 2,405,884 | Gregar | Aug. 13, 1946 |

OTHER REFERENCES

Phosphorus and Its Compounds, vol. 1, 1958, Van Wazer, Interscience Publishers Inc., New York, Interscience Publishers Ltd., London, 1 page, page 852.

Comprehensive Treatise on Inorganic and Theoretical Chemistry, Mellor, Longmans, Green and Company, 39, Paternoster Row, London, 55, Fifth Avenue, New York, 1922, vol. 4, p. 661; vol. 14, p. 852; vol. 14, p. 410.

Friend: Text Book of Inorganic Chemistry, vol. 10, pages 45, 123, 126, 34, 47, 133, 189, 50.

Mellor: Comprehensive Treatise on Inorganic and Theoretical Chemistry, vol. 4, page 390.

UNITED STATES PATENT OFFICE
CERTIFICATE OF CORRECTION

Patent No. 3,126,254                            March 24, 1964

Murrell L. Salutsky et al.

It is hereby certified that error appears in the above numbered patent requiring correction and that the said Letters Patent should read as corrected below.

Column 3, line 24, after "mixture" insert -- to --; column 4, lines 6 and 13, for "alivine", each occurrence, read -- olivine --; column 6, line 36, for "$MgPHO_4 \cdot 3H_2O$" read -- $MgHPO_4 \cdot 3H_2O$ --; column 9, lines 26 and 27, for "properties, at about 175-220° F." read -- phosphate, at about 175-225° F. --.

Signed and sealed this 24th day of November 1964.

(SEAL)
Attest:

ERNEST W. SWIDER
Attesting Officer

EDWARD J. BRENNER
Commissioner of Patents